US012010479B2

(12) United States Patent
Stohr

(10) Patent No.: US 12,010,479 B2
(45) Date of Patent: Jun. 11, 2024

(54) SYSTEM AND METHOD FOR PERCEIVING HIGH AUDIO FREQUENCY IN STEREO THROUGH HUMAN BONES

(71) Applicant: Luis Stohr, Redondo Beach, CA (US)

(72) Inventor: Luis Stohr, Redondo Beach, CA (US)

( * ) Notice: Subject to any disclaimer, the term of this patent is extended or adjusted under 35 U.S.C. 154(b) by 0 days.

(21) Appl. No.: 18/120,661

(22) Filed: Mar. 13, 2023

(65) Prior Publication Data

US 2024/0147135 A1 May 2, 2024

Related U.S. Application Data

(63) Continuation-in-part of application No. 17/975,262, filed on Oct. 27, 2022, now Pat. No. 11,683,633.

(51) Int. Cl.
*H04R 25/00* (2006.01)
*H04R 1/10* (2006.01)

(52) U.S. Cl.
CPC ....... *H04R 1/1075* (2013.01); *H04R 2460/13* (2013.01)

(58) Field of Classification Search
CPC .......................... H04R 2460/13; H04R 25/606
See application file for complete search history.

(56) References Cited

U.S. PATENT DOCUMENTS

RE21,030 E * 3/1939 Greibach ............. H04R 25/606 381/151
2,402,392 A * 6/1946 Goldschmidt ....... H04R 25/606 381/418
5,579,284 A 11/1996 May
5,706,251 A 1/1998 May
8,160,279 B2 * 4/2012 Abolfathi ............. H04R 25/606 381/151
8,295,506 B2 10/2012 Kassayan et al.
8,325,964 B2 12/2012 Weisman
8,345,915 B2 * 1/2013 Shin ........................ H04M 1/03 381/396
9,584,925 B2 * 2/2017 Miller .................... H04R 17/00
9,998,829 B2 * 6/2018 Asfaw .................... H04R 9/025
11,284,206 B2 * 3/2022 Ji ......................... H04R 25/602
11,304,008 B2 * 4/2022 Zhang ...................... H04R 9/06
11,496,845 B1 * 11/2022 Lager ..................... H04R 25/60
11,526,034 B1 * 12/2022 Pattikonda ............. G02C 11/10
2022/0286772 A1 * 9/2022 Zhou ...................... H04R 1/083
2023/0179925 A1 * 6/2023 Fu .......................... H04R 9/025 381/150

FOREIGN PATENT DOCUMENTS

CN 115086841 A * 9/2022
KR 20080036413 A * 4/2008
WO WO-2022132064 A1 * 6/2022

* cited by examiner

*Primary Examiner* — Ryan Robinson
(74) *Attorney, Agent, or Firm* — Che-Yang Chen; Law Office of Michael Chen

(57) ABSTRACT

A system for perceiving high audio frequencies in stereo includes a bone vibration transducer including an exciter configured to receive high frequency signal components and to reproduce the high frequency signal components; and the bone vibration transducer further includes a swingable bar pivotally coupled with the exciter via a pivot holder to perform a swinging movement; wherein in the swinging movement, the swingable bar is swung to generate vibrations waves corresponding to the reproduced high frequency signal components and to convey the vibration waves to at least one bone of a user.

18 Claims, 19 Drawing Sheets

| Legend: YES= Sound Perceived NO=No Sound Perceived | Generator Frequencies | 31.5Hz | 63Hz | 125Hz | 250Hz | 500Hz | 1KHz | 2KHz | 4KHz | 8KHz | 16KHz | 31.5KHz | MUSIC |
|---|---|---|---|---|---|---|---|---|---|---|---|---|---|
| HLT 2(57) | TONE SIGNAL PERCEIBED? | YES | YES | YES | YES | YES | YES | YES | YES | YES | NO | NO | |
| | TONE SIGNAL PERCEIBED WITH BVT? | YES | YES | YES | YES | YES | YES | YES | YES | YES | YES | NO | |
| | MUSIC IS PERCEIBED BETTER? | | | | | | | | | | | | Improvement, clear music |
| HLT 1(7) | TONE SIGNAL PERCEIBED? | YES | YES | YES | YES | YES | YES | YES | YES | YES | YES | NO | |

Fig. 28

SYSTEM AND METHOD FOR PERCEIVING HIGH AUDIO FREQUENCY IN STEREO THROUGH HUMAN BONES

FIELD OF THE DISCLOSURE

The present disclosure relates to a method and apparatus for perceiving high acoustic frequencies (from 8 KHz to 25 KHz) in one channel or stereo signals, and more particularly, to amplify these signals using the pivot method and transform them to vibrations waves which are applied to a unique location: the surface of the maxilla or the mandible bones, through the gum tissue located over the lower side of the human face.

BACKGROUND OF THE DISCLOSURE

Generally, high frequency sound may cause health effects, such as hearing loss, headache, tinnitus, fatigue, dizziness, and nausea. In order to solve these problems, in recent years, there has been a demand for higher sound quality in the field of earphones, headphones, and other acoustic devices.

Aging is one of the most significant indicators of hearing loss. Half of all adults who are 75 years old and older have disabling hearing loss—also known as presbycusis; age-related hearing loss often results in high-frequency hearing loss, which is characterized by not being able to hear high-pitched sounds.

It is important to recognize the early signs of this type of hearing loss so that you can intervene early. Early intervention can change the trajectory of your hearing health, maximize your hearing capacity and enhance daily life. And most importantly, treating hearing loss can help reconnect you to the people you love.

There is, therefore a need for a solution that will enable the older ages (more than 30 years/old) to have a sense of clean, enjoyable sound and precise image of the sound source in the high frequency sound using bone conduction instead of applying high frequencies through the human hearing system.

All referenced patents, applications, and literature are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply. The disclosed embodiments may seek to satisfy one or more of the above-mentioned desires. Although the present embodiments may obviate one or more of the above-mentioned desires, it should be understood that some aspects of the embodiments might not necessarily obviate them.

BRIEF SUMMARY OF THE DISCLOSURE

In a general implementation, a system for perceiving high audio frequencies in stereo may comprise a bone vibration transducer comprising an exciter configured to receive high frequency signal components and reproduce the high frequency signal components; and the bone vibration transducer further comprising a swingable bar pivotally coupled with the exciter via a pivot holder to perform a swinging movement; wherein in the swinging movement, the swingable bar is swung to generate vibrations waves corresponding to the reproduced high frequency signal components and to convey the vibration waves to at least one bone of a user.

In another aspect combinable with the general implementation, the swingable bar is placed adjacent to the mandibular vestibule of the user's mouth.

In another aspect combinable with the general implementation, the exciter is placed outside the user's mouth.

In another aspect combinable with the general implementation, the swingable bar comprises a brass bar and a polymer bar overlappedly arranged on the brass bar.

In another aspect combinable with the general implementation, the brass bar is sandwiched in between the swingable bar and the polymer bar, wherein the swingable bar is pivotally coupled to the brass bar.

In another aspect combinable with the general implementation, in the swinging movement, the swingable bar is vertically moving with respect to the pivot holder.

In another aspect combinable with the general implementation, the system for perceiving high audio frequencies in stereo may further comprise a headphone set placed adjacent to the user's ears and configurated to receive middle-to-low frequency signal components and a second accelerometer placed adjacent to occipital bones of the user to receive the vibration waves and to convey the vibration waves to a second analyzer, wherein the second analyzer is configured to analyze the vibration waves and generate a second high frequency report.

In another aspect combinable with the general implementation, the at least one bone of the user comprises maxilla and/or mandibular bones and/or temporal bones, and/or occipital bones.

In another aspect combinable with the general implementation, the system for perceiving high audio frequencies in stereo may further comprise a first accelerometer coupled to the swingable bar and configured to measure the vibration waves and convey the vibration waves to a first analyzer, wherein the first analyzer is configured to analyze the vibration waves and generate a first high frequency report.

In another aspect combinable with the general implementation, the system for perceiving high audio frequencies in stereo may further comprise a high pass filter communicated with a headphone set and a low pass filter communicated with the exciter, wherein the high pass filter is configured to extract high frequency signal components from input audio signals, and the low pass filter is configured to extract medium-to-low frequency signal components from the input audio signals.

Another aspect of the embodiment is directed to methods of perceiving high audio frequency in stereo, comprising:

- pivotally coupling a swingable bar with an exciter via a pivot holder to form a bone vibration transducer;
- receiving, by the exciter, high-frequency signal components and reproducing the high frequency signal components;
- generating, by the swingable bar, vibration waves corresponding to the reproduced high frequency signal components in a swinging movement; and
- conveying, by the swingable bar, the vibration waves to at least one bone of a user.

Among the many possible implementations of the method for perceiving high audio frequency in stereo may comprise a step of:

- placing the swingable bar adjacent to the mandibular vestibule of the user's mouth.

Further, it is contemplated that the method may comprise a step of:

- positioning the exciter outside the user's mouth.

In the alternative, the swingable bar comprises a brass bar and a polymer bar overlappedly arranged on the brass bar.

It is still further contemplated that the brass bar is sandwiched in between the swingable bar and the polymer bar, and the swingable bar is pivotally coupled to the brass bar.

In still some embodiments, the step of generating, by the swingable bar, vibration waves corresponding to the reproduced high frequency signal components in a swinging movement may comprise a step of:

vertically moving the swingable bar with respect to the pivot holder.

In still some embodiments, the method may further comprise steps of:

placing a headphone set adjacent to the user's ears, wherein the headphone set is configurated to receive middle-to-low frequency signal components;

placing a second accelerometer adjacent to the occipital bones of the user;

receiving, by the second accelerometer, the vibration waves and conveying the vibration waves to the second analyzer; and analyzing, by the second analyzer, the vibration waves to generate a second high frequency report.

Among the many possible implementations of the method for perceiving high audio frequency in stereo, the at least one bone of the user comprises maxilla and/or mandibular bones and/or temporal bones, and/or occipital bones.

Accordingly, the present disclosure is directed to the method for perceiving high audio frequency in stereo, wherein the method may further comprise steps of:

coupling a first accelerometer on the swingable bar;

measuring, by the first accelerometer, the vibration waves and conveying the vibration waves to a first analyzer;

analyzing, by the first analyzer, the vibration waves to generate a first high frequency report.

In one embodiment, the method may further comprise steps of:

communicating a high pass filter with a headphone set;

extracting, by the high pass filter, high frequency signal components from input audio signals;

communicating a low pass filter with exciter; and extracting, by the low pass filter, medium-to-low frequency signal components from the input audio signals.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features described in the context of a single implementation can also be implemented in multiple implementations separately or in any suitable subcombination. Moreover, although features may be described above and below as acting in certain combinations and even initially claimed as such, one or more features from a claimed combination can, in some cases, be excised from the combination, and the claimed combination may be directed to a subcombination or variation of a subcombination.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

It should be noted that the drawing figures may be in simplified form and might not be to precise scale. In reference to the disclosure herein, for purposes of convenience and clarity only, directional terms such as top, bottom, left, right, up, down, over, above, below, beneath, rear, front, distal, and proximal are used with respect to the accompanying drawings. Such directional terms should not be construed to limit the scope of the embodiment in any manner.

FIG. 28 shows collected data from experiment 2 as shown in FIG. 27.

DETAILED DESCRIPTION OF THE EMBODIMENTS

The different aspects of the various embodiments can now be better understood by turning to the following detailed description of the embodiments, which are presented as illustrated examples of the embodiments defined in the claims. It is expressly understood that the embodiments as defined by the claims may be broader than the illustrated embodiments described below.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

It shall be understood that the term "means," as used herein, shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials, or acts and the equivalents thereof shall include all those described in the summary of the invention, brief description of the drawings, detailed description, abstract, and claims themselves.

Unless defined otherwise, all technical and position terms used herein have the same meaning as commonly understood by one of ordinary skill in the art to which the invention pertains. Although many methods and materials similar, modified, or equivalent to those described herein can be used in the practice of the present invention without undue experimentation, the preferred materials and methods are described herein. In describing and claiming the present invention, the following terminology will be used in accordance with the definitions set out below.

Figure 1:
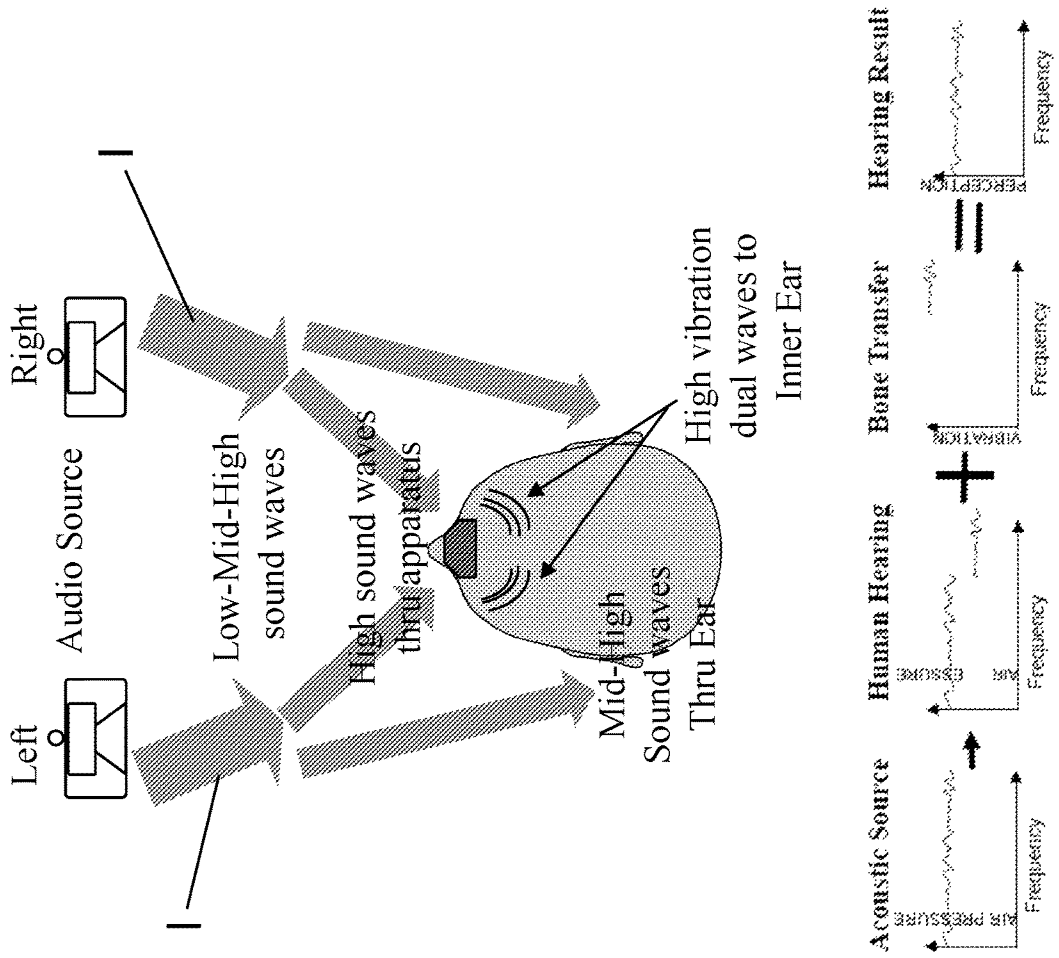
FIG. 1 is a system for perceiving high audio frequencies according to an aspect of the embodiment.

FIG. 1 generally depicts a system for perceiving high audio frequencies according to an aspect of the embodiment.

Figure 2:
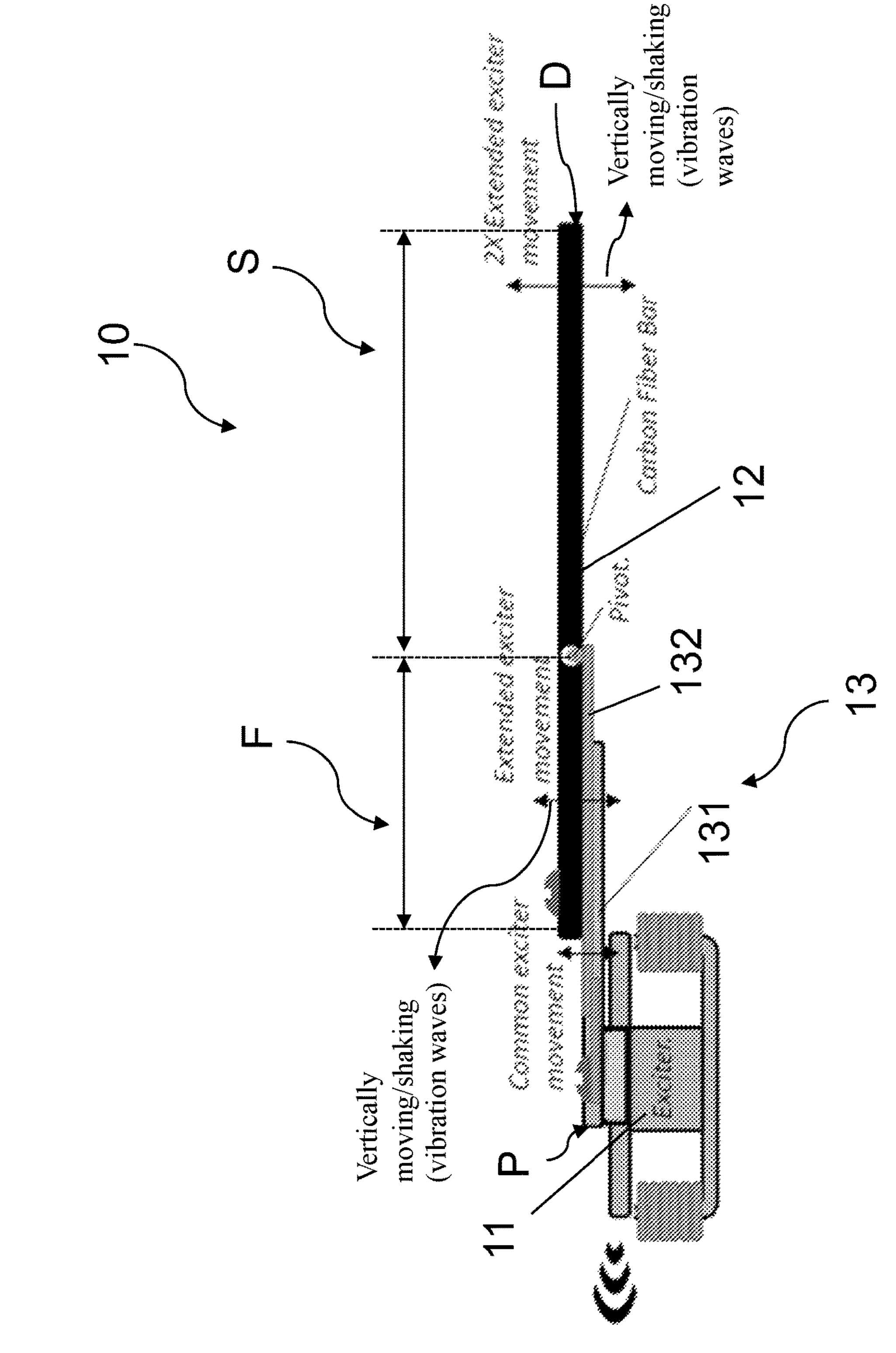
FIG. 2 is a view of a bone vibration transducer of the system for perceiving the high audio frequencies according to an aspect of the embodiment.

Referring to FIG. 1, the system for perceiving the high audio frequencies (from 8 KHz to 25 KHz) from input audio signals "I" (in one channel or stereo signals) may be configured to amplify the high audio frequencies using a bone vibration transducer (BVT) 10 (as shown in FIG. 2), wherein the high audio frequencies may be transformed to vibrations waves that are applied to a unique location: the surface of the Maxilla or the Mandible bones of a user. In some embodiments, the vibration waves may be applied to the gum tissues of the user's face (the lower side of the human face), and the vibration waves may be transferred to the user's hearing system through the bones (Maxilla or Mandible) transfer.

FIG. 2 generally depicts the bone vibration transducer 10 of the system for perceiving the high audio frequencies according to an aspect of the embodiment.

Referring to FIG. 2, the bone vibration transducer (BVT) 10 may comprise an exciter 11 configured to receive high frequency signal components and reproduce the high frequency signal components and a swingable bar 12 coupled with the exciter 11 through a pivot holder 13. In some embodiments, the swingable bar 12 may be pivotably mounted on the exciter 11 via the pivot holder 13 to form a swinging movement, wherein, in the swinging movement, the swingable bar 12 may be swung to generate vibrations waves corresponding to the reproduced high frequency signal components and the vibration waves may be conveyed to at least one bone of the user.

In some embodiments, the swingable bar 12 may comprise carbon graphite and/or fiber glass. In some embodiments, the pivot holder 13 comprises a brass bar 132 and a polymer bar 131 overlappedly arranged the brass bar 132, wherein the polymer bar 131 is affixed to the exciter 11 and the brass bar 132 is pivotally coupled with the swingable bar 12 via a pivot. In other words, the brass bar 132 may be sandwiched in between the swingable bar 12 and the polymer bar 131.

In some embodiments, the swingable bar 12 may comprise the pivot, wherein the pivot holder 13 may be pivotally coupled with the swingable bar 12 through the pivot. In still some embodiments, the swingable bar 12 may be divided by the pivot to form a first section "F" and a second section "S". wherein a length of the second section "S" may be twice time longer than a length of the first section "F". In other words, in some embodiment, the ratio between the length of the first section "F" and the length of the second section "S" is 1:2. In such a way, this ratio may increase the vibration waves applied on the user's bones.

In some embodiments, in the swinging movement, the swingable bar 12 may be vertically shaking or moving with respect to the pivot holder 13. In still some embodiments, the swingable bar 12 may be horizontally extended along the pivot holder, wherein, in the swinging movement, the swingable bar 12 may be vertically shaking or moving with respect to the pivot holder 13.

Figure 3A:
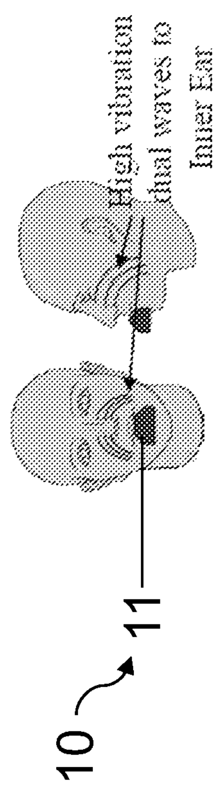
FIGS. 3A-3B show that the bone vibration transducer cooperates with the human's mouth according to an embodiment aspect.
Figure 3B:
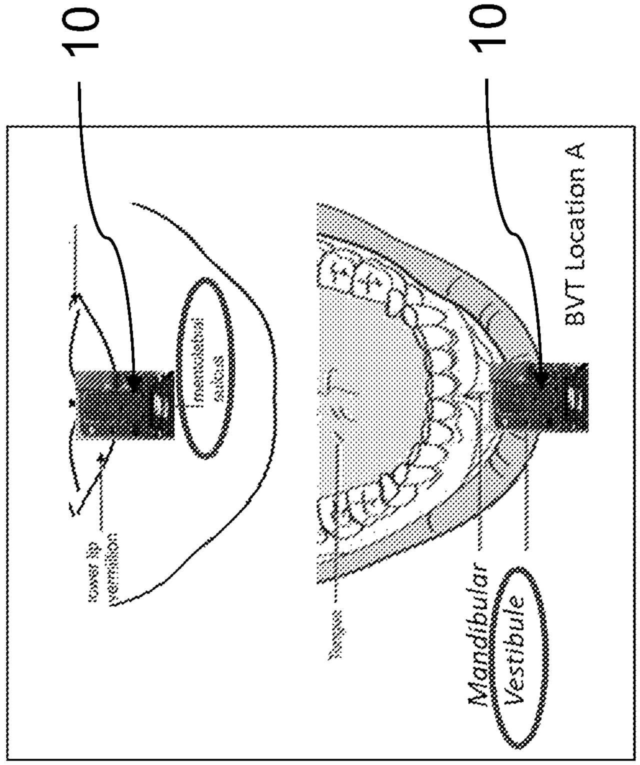

FIGS. 3A-3B generally depict the bone vibration transducer (BVT) 10 of the system for perceiving the high audio frequencies, showing the swingable bar placed inside the human's mouth according to an aspect of the embodiment.

Referring to FIGS. 3A-3B, the swingable bar is placed adjacent to the mandibular vestibule of the user's mouth, and the exciter 11 is placed outside the user's mouth.

In some embodiments, as shown in FIG. 2, the bone vibration transducer (BVT) 10 may comprise a length defined between a distal end "D" of the swingable bar 12 and a proximal end "P" of the pivot holder 13, wherein the distal end "D" of the swingable bar 12 may be away from to the exciter 11 and the proximal end "P" of the pivot holder 13 may be adjacent to the exciter 11. In some embodiments, the length of the bone vibration transducer (BVT) 10 may be 42 mm or 28 mm, or 23 mm, and in such a way, the swingable bar 12 may be located inside the user's mouth and adjacent to the mandibular vestibule of the user's mouth.

In some embodiments, the exciter 11 may be placed on a lower side of the user's face, wherein the exciter 11 may be placed on the mentolabial sulcus of the user, and in such a manner, the exciter 11 may be biased against the vermilion lip of the user.

It should be noted that the swingable bar 12 may not be in contact with any user's tooth/teeth. In some embodiments, the vibration waves may be emitted to the maxilla or the mandibular bones.

Figure 4:
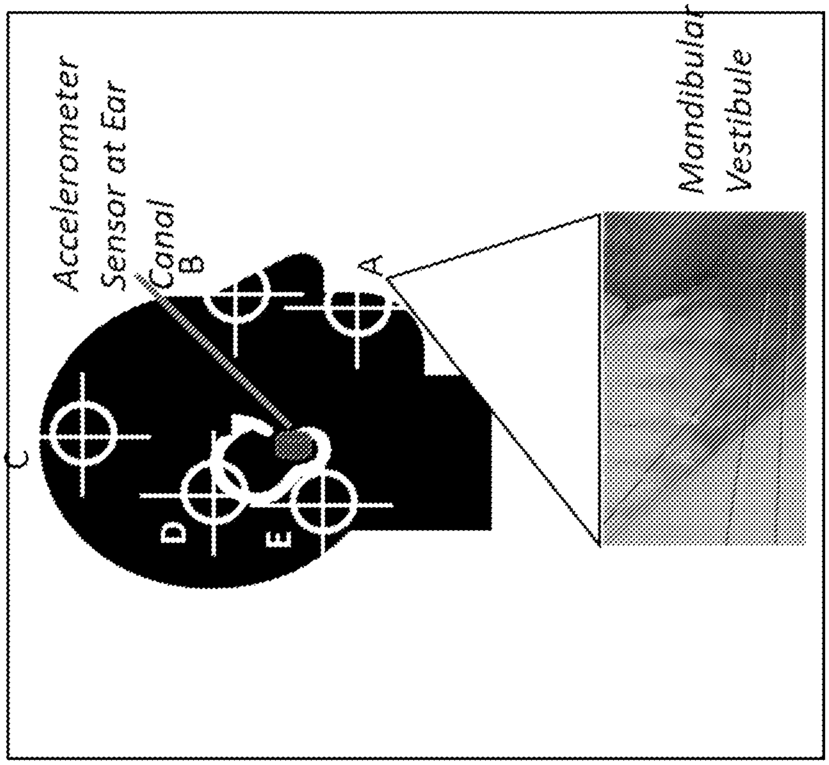
FIG. 4 shows a location where the bone vibration transducer cooperates with the human's head according to an aspect of the embodiment.

FIG. 4 generally depicts a location where the bone vibration transducer (BVT) is located at the human head according to an aspect of the embodiment.

Referring to FIG. 4, the swingable bar may be located at the buccal vestibule of the user in contact with the gingivae (gums) of the user to vibrate the alveolar process bone of the mandible (A), the nose close to the nasal bone close to the user's nose (B), parietal bone of the top of the head (C), the temporal bone over the upper side of the user's ear (D) and the temporal bone under the lower side of the user's ear (E) which covers the hearing system.

In some embodiments, the location "D" and the location "E" may be measured on each side (Left and Right) of the user under a first accelerometer and a second accelerometer as mentioned below. In still some embodiments, all of the above-mentioned locations, "A-E" are chosen because they are the thinnest and closest to the cranial bones surfaces (human hearing organs.

Accordingly, the vibrations waves may be conveyed to at least one bone of the user, wherein the at least one bone of the user comprises maxilla and/or mandibular bones and/or temporal bones, and/or occipital bones.

In some embodiments, the bone vibration transducer (BVT) 10 may be covered by the rubber latex polymer, which FDA approves to make baby's pacifiers, teeth grinder protectors, and sports mouth protectors. For another example, the bone vibration transducer (BVT) 10 may be covered by Nylon material.

In some embodiments, a lubricant may be used with the bone vibration transducer (BVT) to smooth the use of the bone vibration transducer (BVT) 10 in the user's mouth. For example, the lubricant may be 100% silicone grease made by Trident (#LP20), used by scuba divers to lubricate their mouthpieces.

Figure 5:
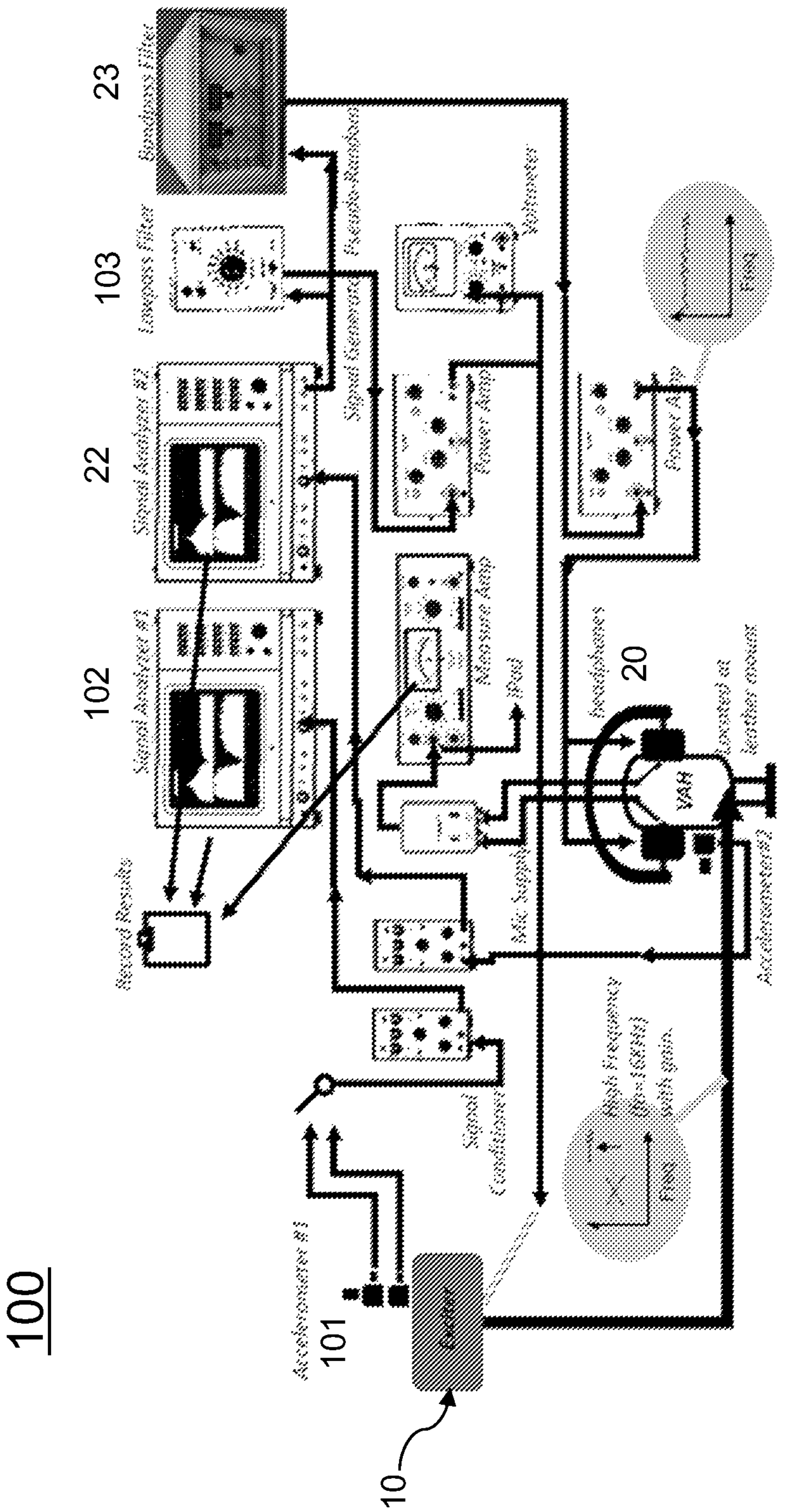
FIG. 5 is a schematic diagram of the system for perceiving high audio frequencies according to an aspect of the embodiment.

FIG. 5 generally depicts the system 100 for perceiving high audio frequencies according to an aspect of the embodiment.

Referring to FIG. 5, the system 100 may further comprise a headphone set 20 placed adjacent to the user's ears and configurated to receive middle-to-low frequency signal components and a second accelerometer 21 placed adjacent to occipital bones of the user to receive the vibration waves and convey the vibration waves to a second analyzer 22, wherein the second analyzer 22 is configured to analyze the vibration waves and generate a second high frequency report.

As shown in further detail in FIG. 5, the system 100 may further comprise a first accelerometer 101 coupled on the swingable bar 12 (see FIG. 2) and is configured to measure the vibration waves, wherein the vibration waves may be conveyed to a first analyzer 102, and in such a manner, the first analyzer 102 may analyze the vibration waves to generate a first high frequency report.

Continuing to FIG. 5, the system 100 may further comprise a high pass filter (bandpass filter) 23 communicated with the headphone set 20, wherein the high pass filter 23 may be configured to extract high frequency signal components from input audio signals. And, in such a way, the high frequency signal components may be conveyed to the headphone set 20.

In still some embodiments, the system 100 may further comprise a low pass filter 103 communicated with the bone vibration transducer (BVT) 10, wherein the low pass filter 103 may be configured to extract medium-to-low frequency signal components from the input audio signals.

Figure 6:
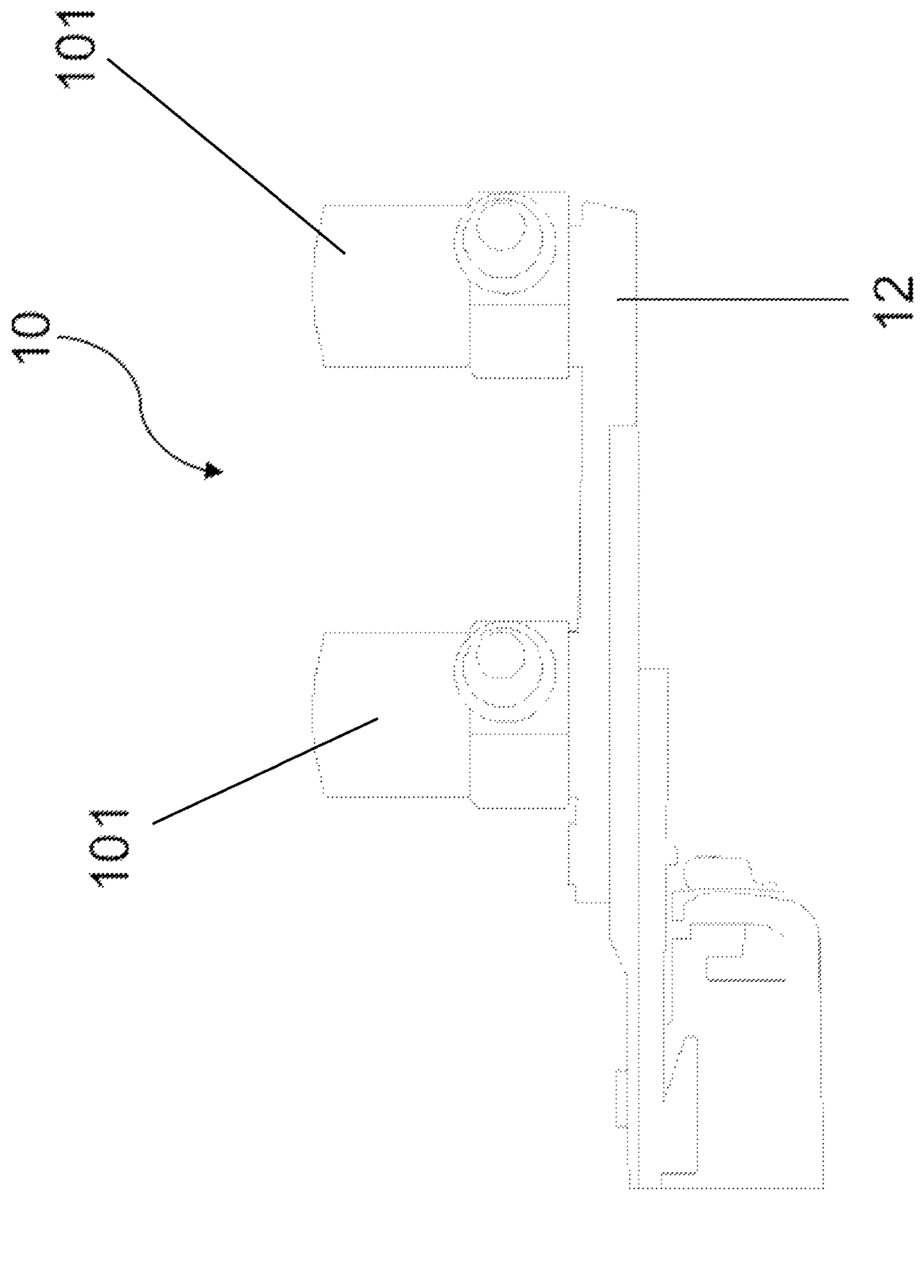
FIG. 6 is a section view of the bone vibration transducer of the system for perceiving high audio frequencies according to an aspect of the embodiment.

FIG. 6 generally depicts the bone vibration transducer (BVT) 10 for perceiving high audio frequencies according to an aspect of the embodiment.

Referring to FIG. 6, the system may further comprise multiple first accelerometers 101 coupled on the swingable bar 12 and is configured to measure the vibration waves, wherein each of the first accelerometers 101 is spacedly arranged with one another. In some embodiments, the vibration waves may be conveyed to the first analyzer 102 (see FIG. 5), and in such a manner, the first analyzer 102 may analyze the vibration waves to generate the first high frequency report.

FIGS. 7-11 generally depict a method for perceiving high audio frequency in stereo 200 according to an aspect of the embodiment.

Figure 7:
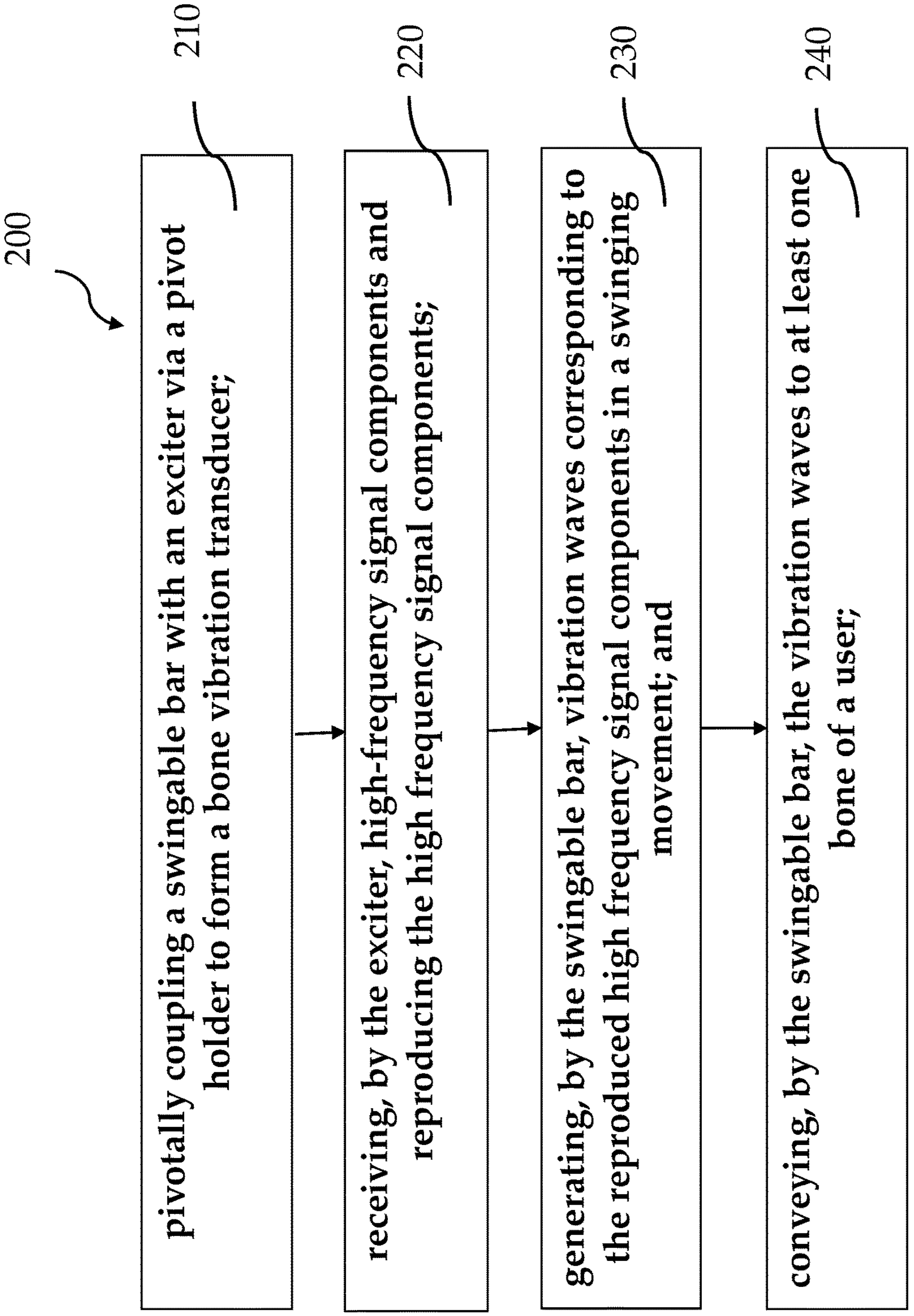
FIGS. 7-11 are flowcharts of a method for perceiving high audio frequency in stereo according to an aspect of the embodiment.

Referring to FIG. 7, the method 200 may comprise steps of:

- pivotally coupling the swingable bar with the exciter via the pivot holder to form a bone vibration transducer (BVT) 210;
- receiving, by the exciter, high-frequency signal components and reproducing the high frequency signal components 220;
- generating, by the swingable bar, vibration waves corresponding to the reproduced high frequency signal components in a swinging movement 230; and
- conveying, by the swingable bar, the vibration waves to at least one bone of a user 240

Figure 8:
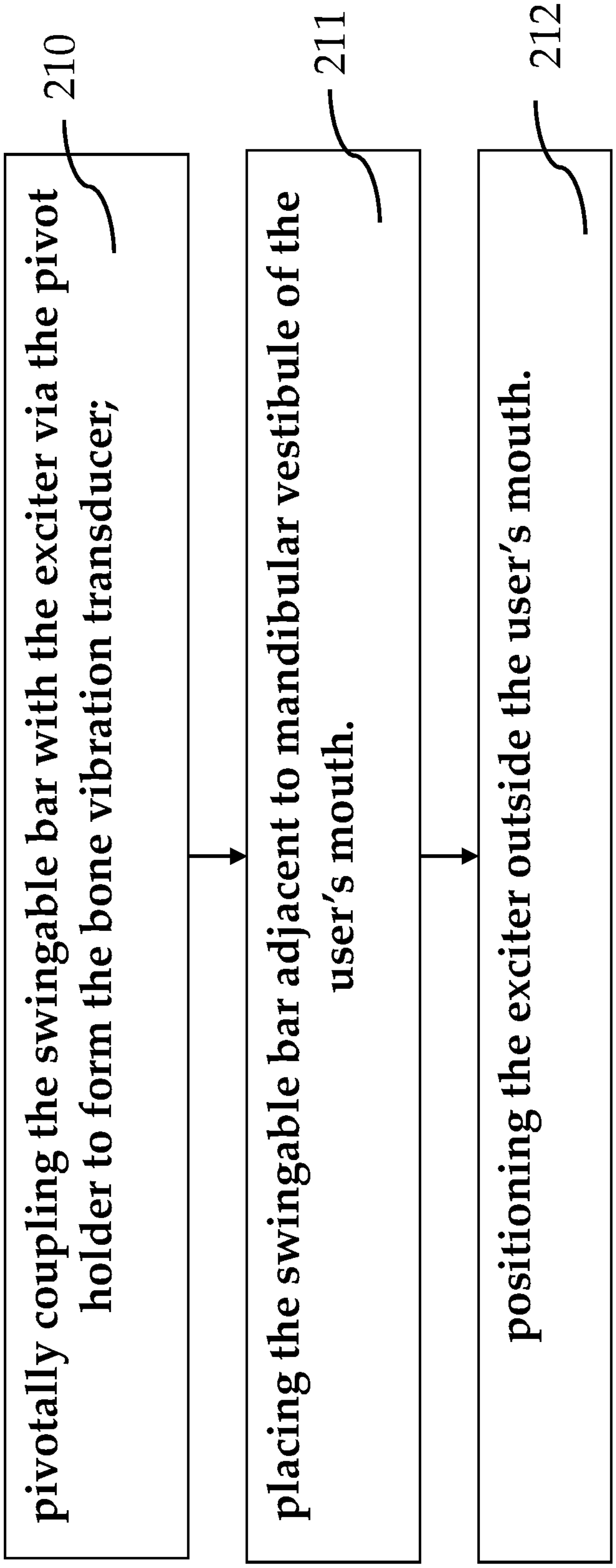

Referring to FIG. 8, the method 200 may further comprise steps of:

- placing the swingable bar adjacent to the mandibular vestibule of the user's mouth 211; and
- positioning the exciter outside the user's mouth 212.

In some embodiments, the pivot holder may comprise a brass bar and a polymer bar overlappedly arranged on the brass bar.

In still some embodiments, the brass bar may be sandwiched in between the swingable bar and the polymer bar, wherein the swingable bar may be pivotally coupled to the brass bar.

Figure 9:
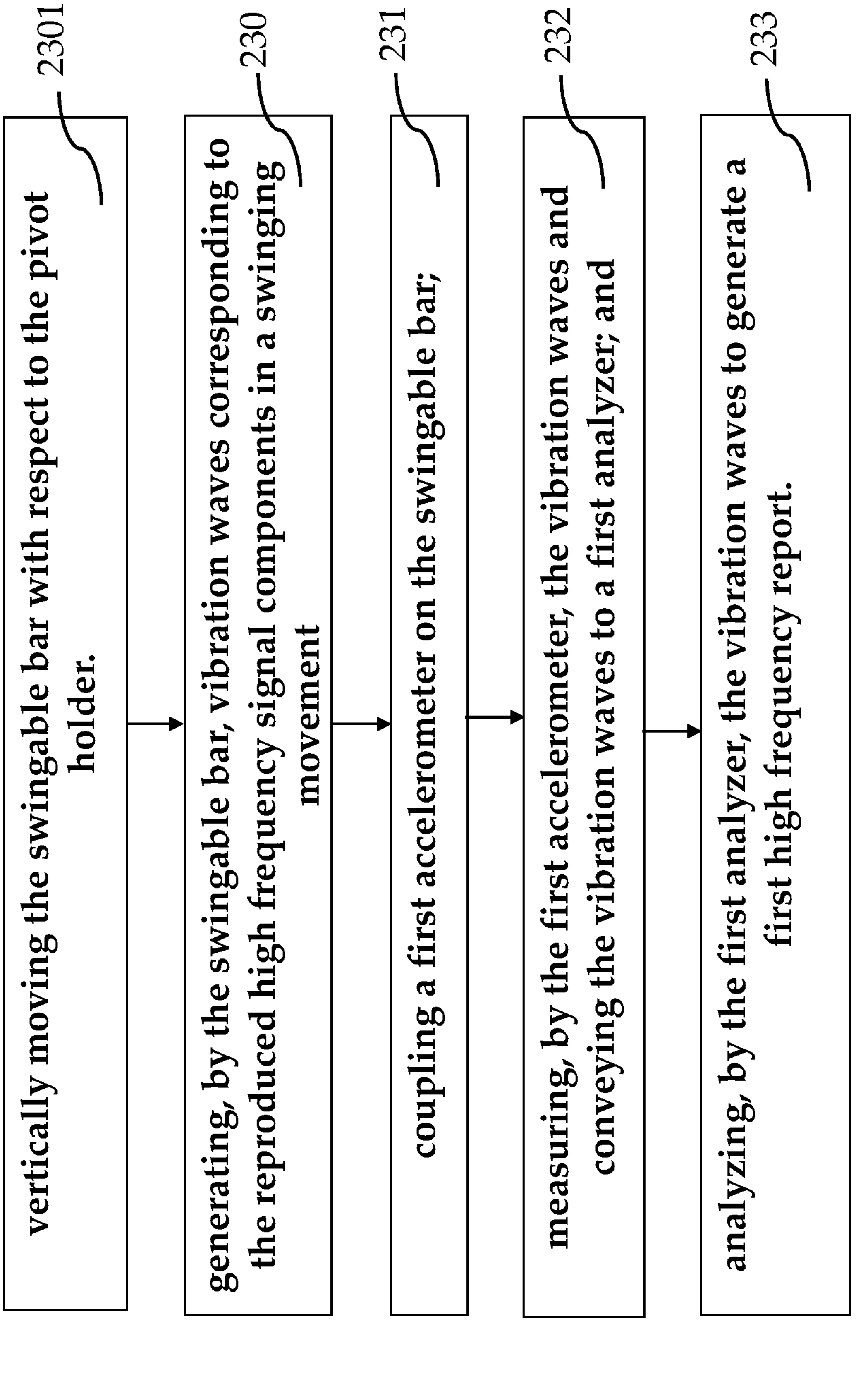

Referring to FIG. 9, in still some embodiments, before the step of generating, by the swingable bar, vibration waves corresponding to the reproduced high frequency signal components 230, further comprises a step of:

- vertically moving the swingable bar with respect to the pivot holder 2301.

In still some embodiments, after the step of generating, by the swingable bar, vibration waves corresponding to the reproduced high frequency signal components 230, further comprises steps of

- coupling the first accelerometer on the swingable bar 231;
- measuring, by the first accelerometer, the vibration waves and conveying the vibration waves to the first analyzer 232; and
- analyzing, by the first analyzer, the vibration waves to generate a first high frequency report 233.

Figure 10:
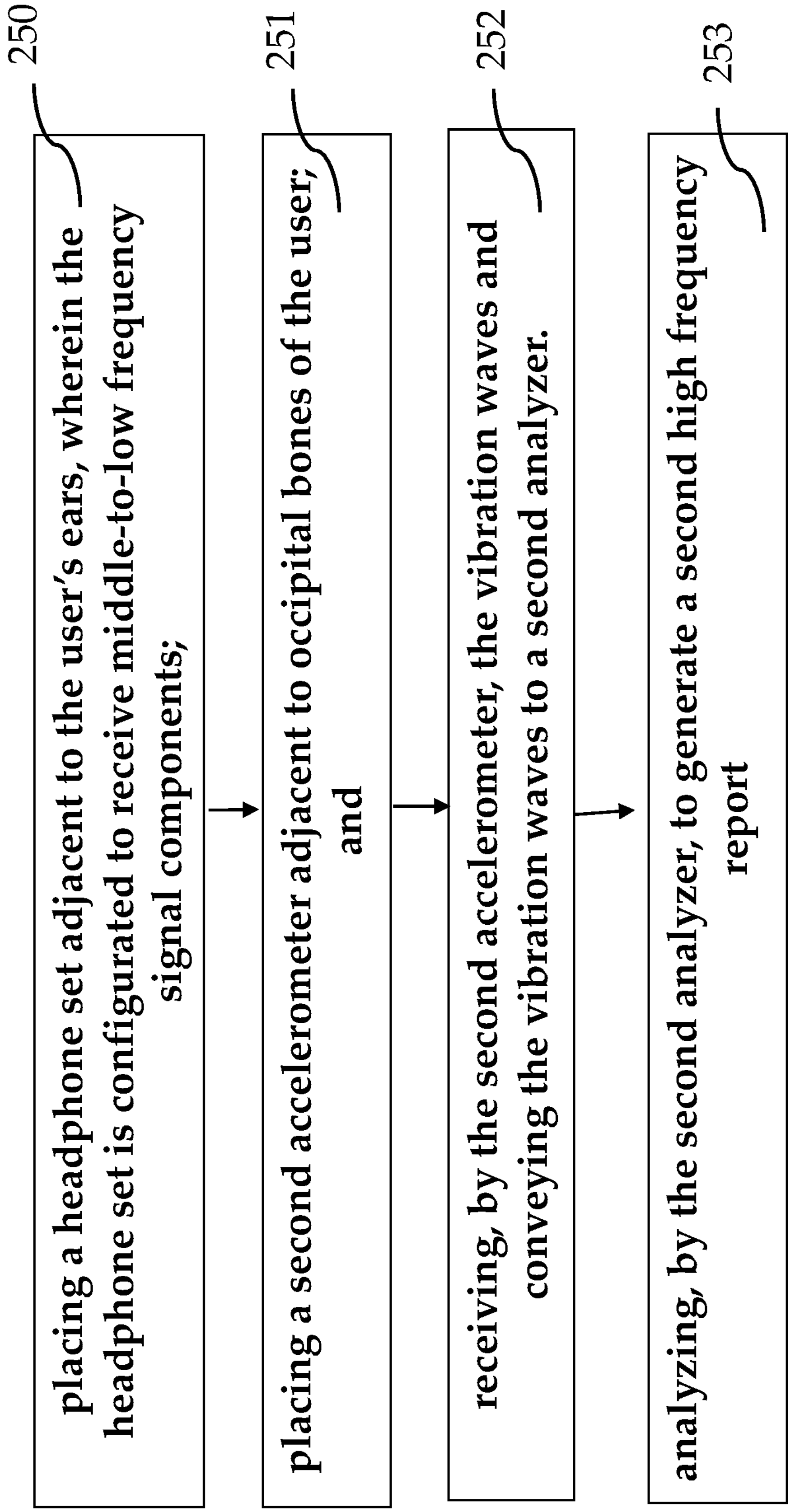

Referring to FIG. 10, the method further comprising steps of:

- placing a headphone set adjacent to the user's ears, wherein the headphone set is configurated to receive middle-to-low frequency signal components 250;
- placing a second accelerometer adjacent to the occipital bones of the user 251;
- receiving, by the second accelerometer, the vibration waves and conveying the vibration waves to a second analyzer 252; and
- analyzing, by the second analyzer, the vibration waves to generate a second high frequency report 253.

In some embodiments, the at least one bone of the user comprises maxilla and/or mandibular bones and/or temporal bones, and/or occipital bones.

Figure 11:
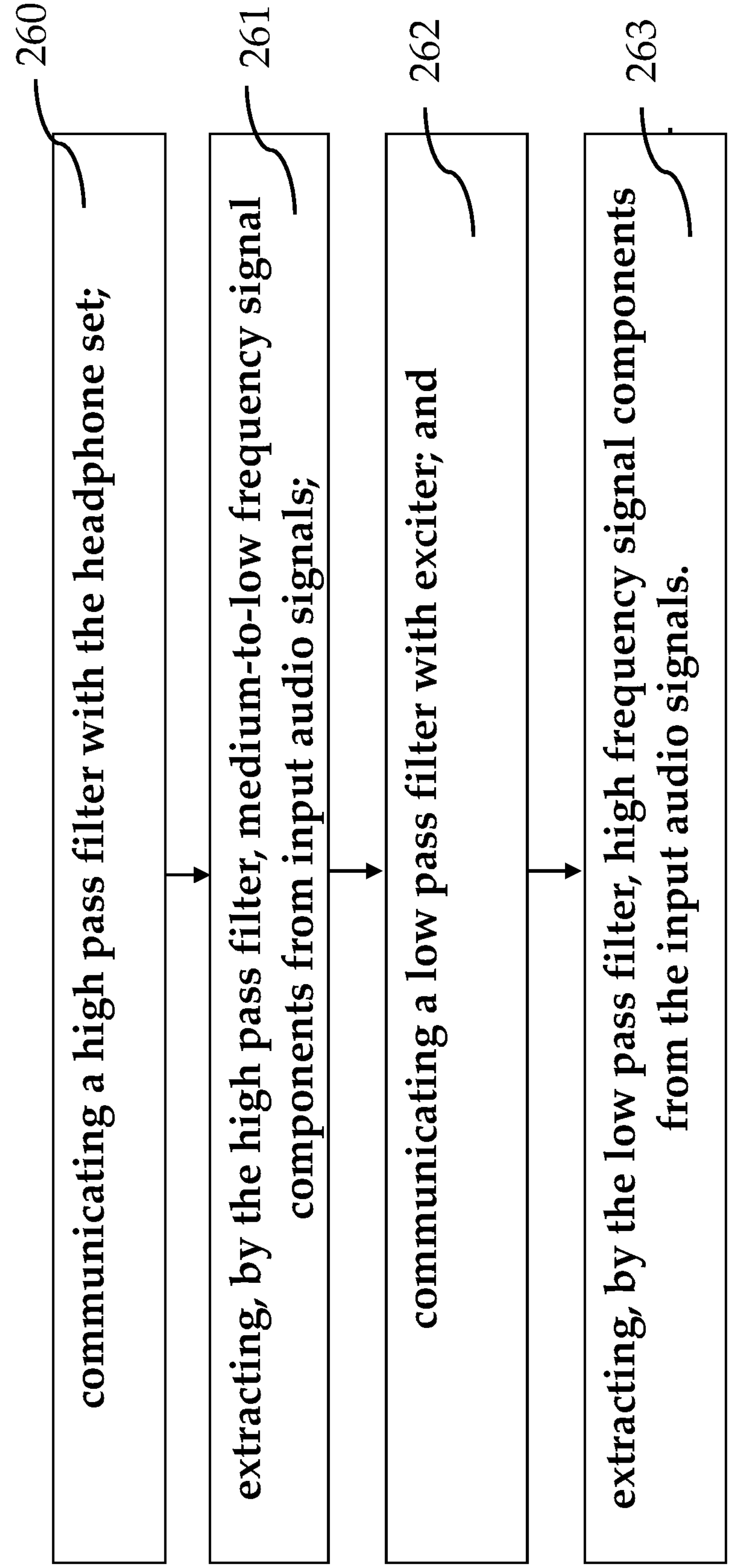

Referring to FIG. 11, the method 200 may further comprise steps of:

- communicating a high pass filter with the headphone set 260;
- extracting, by the high pass filter, high frequency signal components from input audio signals 261;
- communicating a low pass filter with exciter 262; and
- extracting, by the low pass filter, medium-to-low frequency signal components from the input audio signals 263.

Experiment 1

Quantitative experimentation measuring the apparatus acceleration performance with respect to a common exciter to demonstrate that the implementation of CARBON GRAPHITE and the "PIVOT METHOD" improve the (bone vibration transducer) BVT performance.

Figure 12:
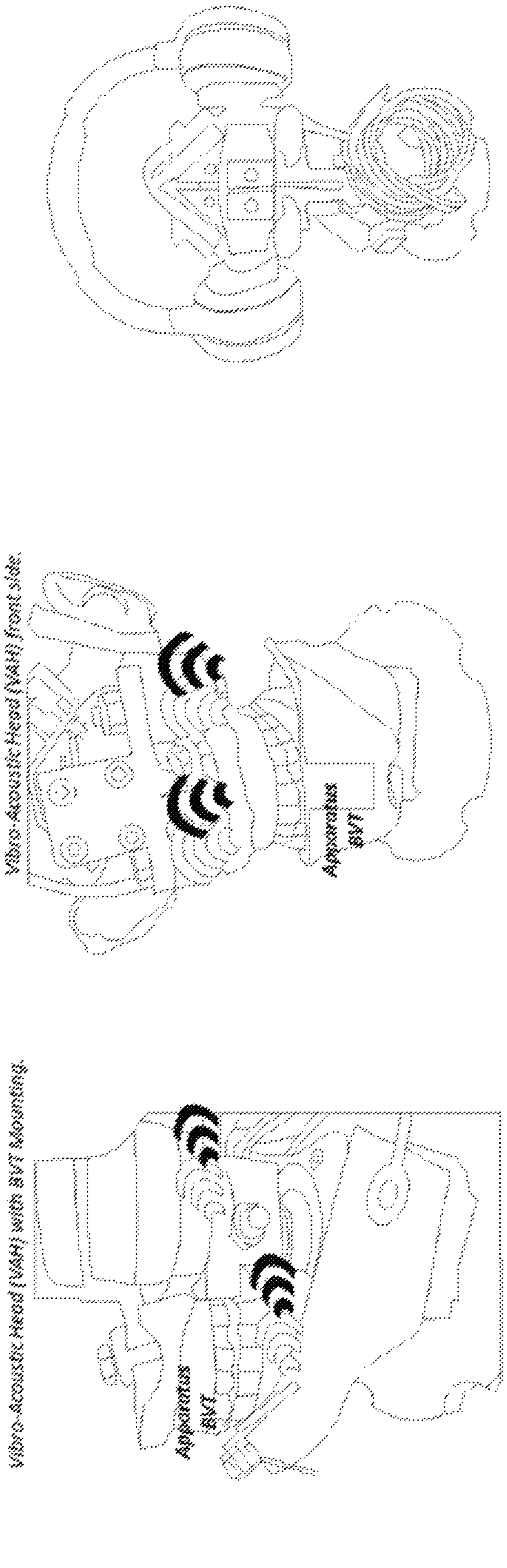
FIG. 12 are view of the bone vibration transducer in detail to measure actual perception emulation using the vibro-acoustic head (VAH).

Referring to FIG. 12, FIG. 12 is an overview of the (bone vibration transducer) BVT in detail to measure actual perception emulation using the vibro-acoustic head (VAH). Because the BVT and the method used to emit vibrations are designed for a human mounting device, ideally, a human head should be used for the experimentation, although this generates many issues. The BVT mounting on the body position or the moving head may generate major errors.

These errors are easily experienced during headphones and earbuds testing if BVT is moving just 1 millimeter, and in such a manner, the frequency response is corrupted. In acoustics testing, a dummy head is used, but the acoustic dummy heads do not have the appropriate head mass or mouth/lower face mounting emulation setups. A vibro-acoustic simulation head (VAH) may be built with the same mass as a human head, including two microphones and an external hearing emulation, and in such a manner, the headphones or earbuds can be tested together with the BVT mounted on a leather made lower face setup.

1.1 Experiment Procedure

Figure 13:
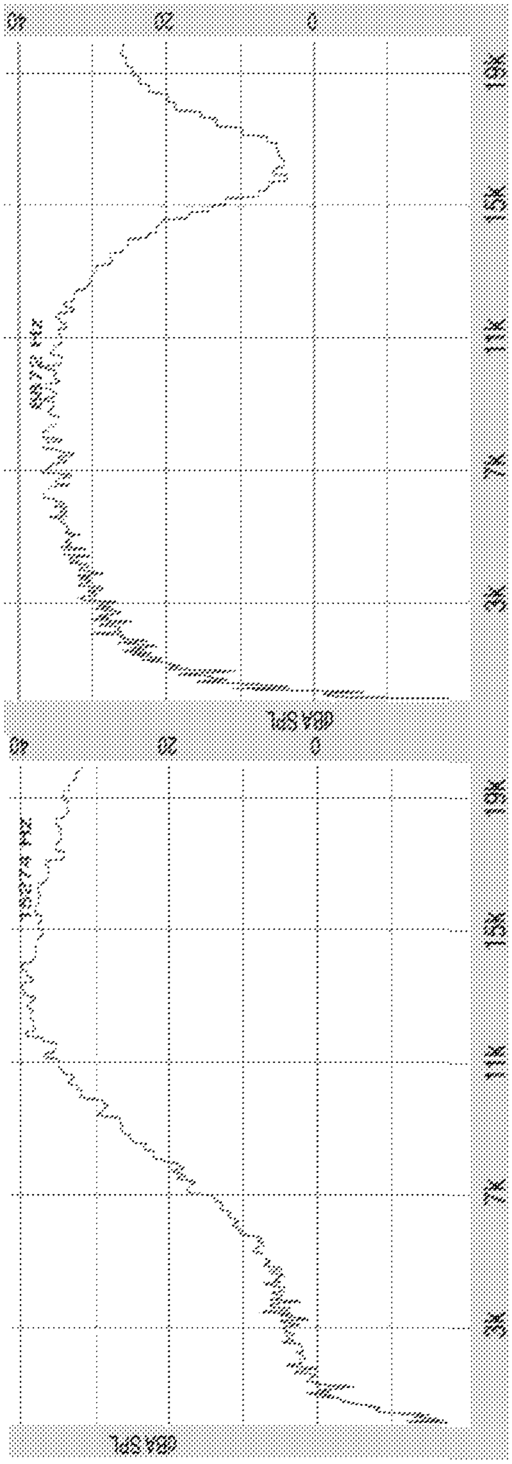
FIGS. 13-14 show experiment 1 having a modal analysis required to determine appropriate forces, excitation responses, control excessive vibrations, and resonance points.
Figure 14:
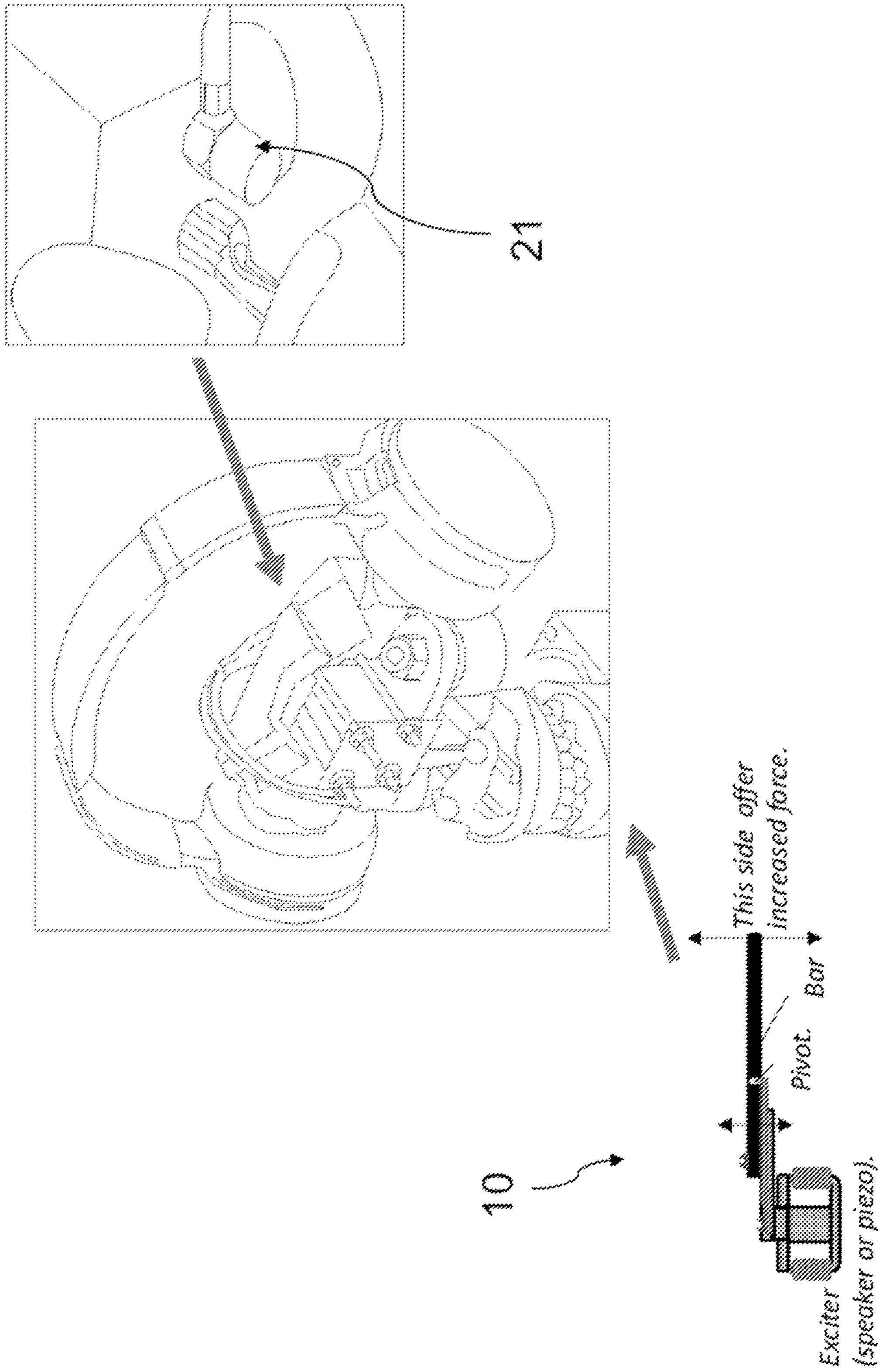
Figure 15:
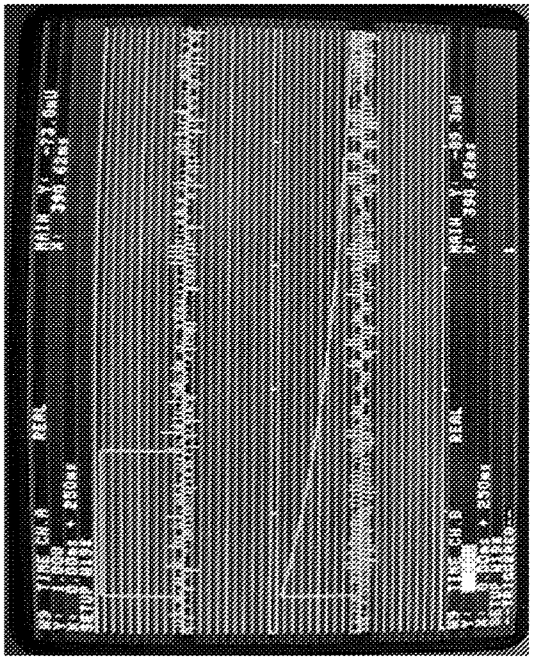
FIGS. 15-26 show collected data and findings of experiment 1 as shown in FIGS. 13-14.

Referring to FIGS. 13-14, modal analysis is required to determine appropriate forces, responses to excitations, control excessive vibrations, and resonance points. A force is applied to the system, the acceleration is measured, and their relation defines the function H(ω). The spectrum analyzer generates a Pseudo-Random noise similar to Pink noise that is filtered into two signals: a high frequency band and a mid-to-low frequency band. The high and mid-to-low frequencies are the result of a high-pass filter (cut-off at 11 KHz, ⅓ octave) and a low-pass filter (cut-off at 11 KHz, ⅓ octave) (FIG. 13). Both signals are amplified, and the high frequency signal is applied to the exciter, and the middle-to-low frequency signal is applied to the headphones (see FIG. 14). Microphones on the VAH capture the middle-to-low frequency signal, which has a pleasant sound level for headphones between 30 to 40 dB S.P.L. (see FIG. 13). The exciter is attached to the lower face of the VAH and reproduces high frequency vibration signal through a bone vibration transducer (BVT) 10 (see FIG. 14). Then, the vibration is captured by the second accelerometer 21 attached to the VAH area, wherein the vibration simulates the occipital bone where the hearing system simulation is located. The signals from the bone vibration transducer (BVT) 10 and the second accelerometer 21 are conditioned, and the signals are applied to the signal analyzers to perform measurements and recordings.

1.2 Collected Data and Findings

Figure 16:
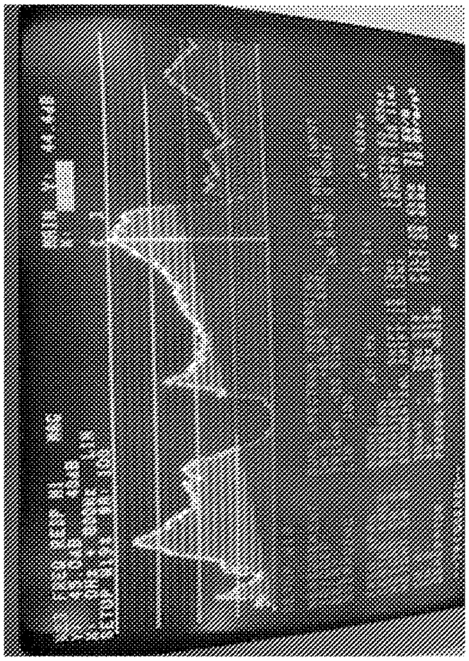
Figure 17:
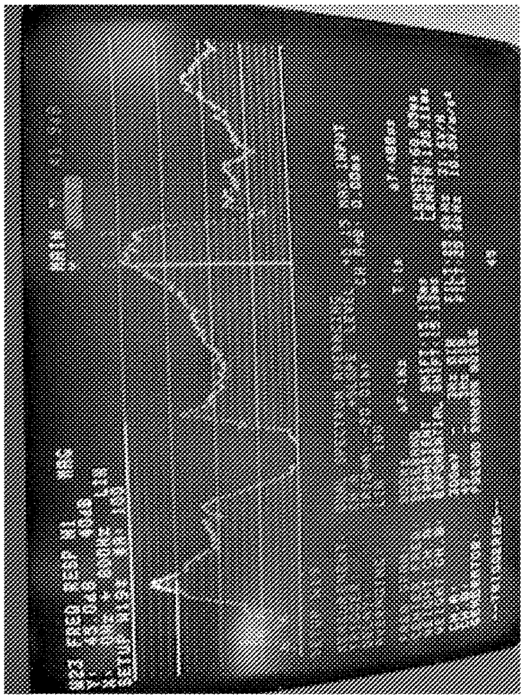
Figure 18:
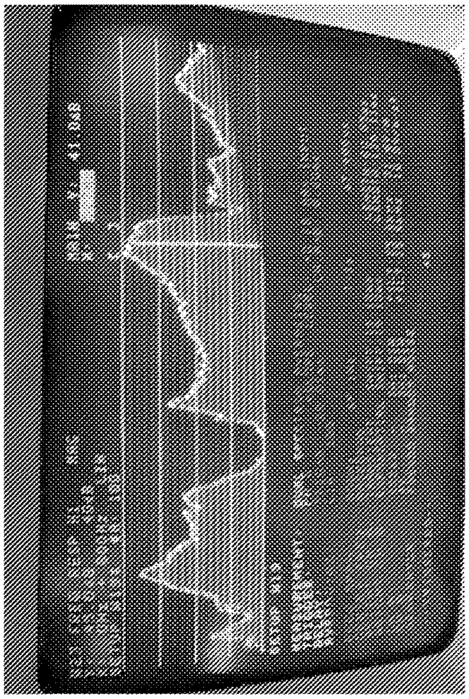
Figure 19:
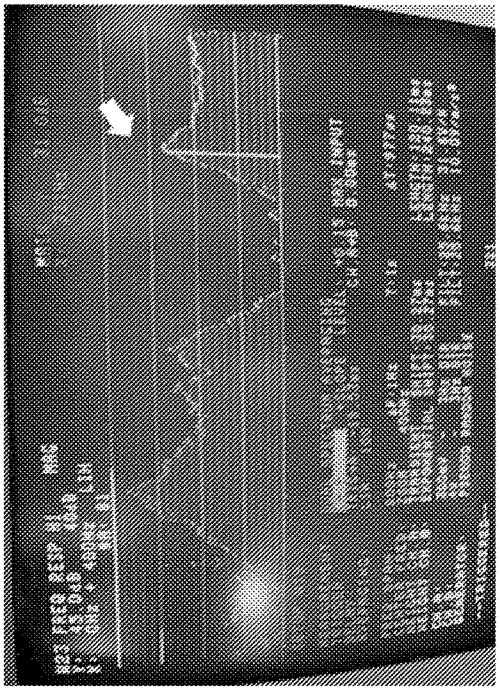
Figure 20:
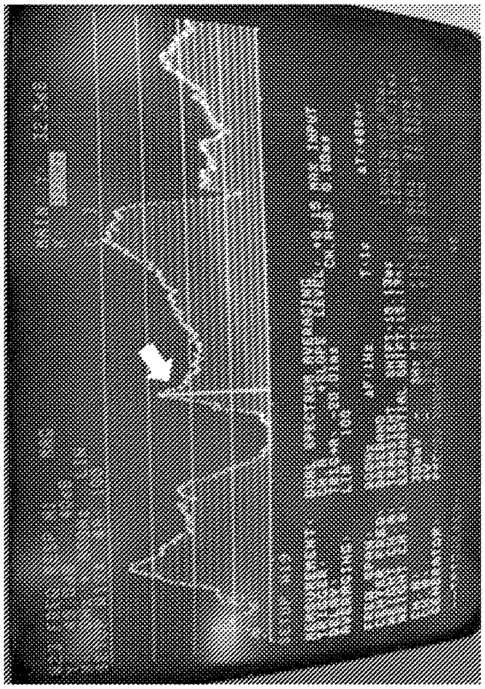
Figure 21:
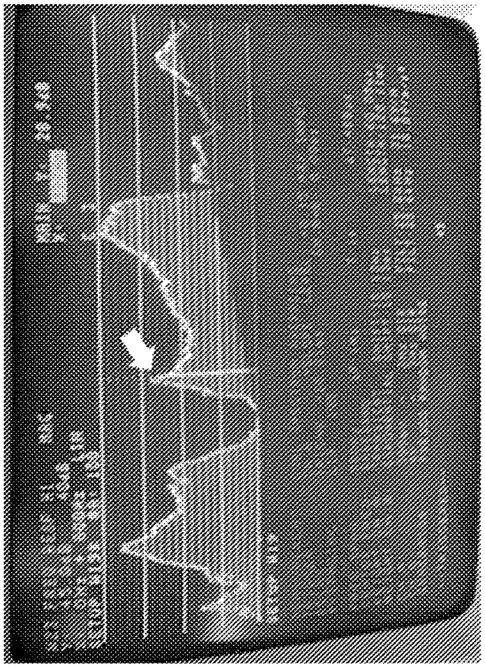

Referring to FIGS. 15-18, the power transmitted is independent of the bandwidth. The averaged frequency spectrum is scaled in terms of mean square power or mean root square. The time recorded shows a fraction of the total power within the width selected to be +/−1 pC/N, captured by the bone vibration transducer (BVT). This value is the recorded result applied by the exciter to the VAH, with the Power Spectral Density being 2 pC/N (upper side of FIG. 15). The charge amplifier gains the vibration magnitude in the time domain to be +/−1.25 pC/ms2 or 2.5 pC/ms2 (lower side of FIG. 15). The modal parameters will be defined by the structure vibration properties. The modal parameters are modal frequency, modal damping, and modal shape. The magnitude of the frequency response function for the structure test is measured from 0 Hz to 800 Hz (FIG. 16). The modal frequency of the system is 524 Hz as the highest magnitude or resonance frequency. Defining the damping frequencies at half power or +/−3 dB from modal frequency lower side, or −3 dB, is 509 Hz (FIG. 17), and the higher side, or +3 dB is 527 Hz (FIG. 18).

Figure 22:
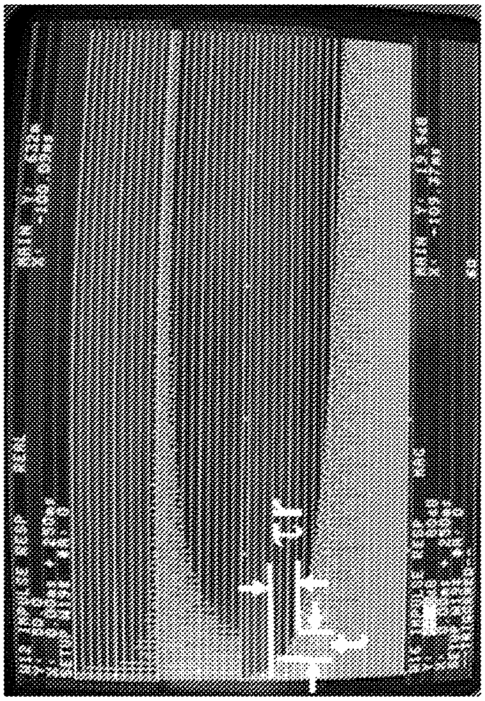

Continuing to FIGS. 19-22, the modal damping is defined as:

$$\delta r = f2 - f1 \backslash 2fr$$

where f2-f1 is 18 Hz and 2 fr is 1028 Hz, so the modal damping is 0.02. The impulse response function is represented by its magnitude on a logarithmic scale to determine the decay rate or damping ratio, where x is 0 to 250 ms and y is 60 dB to 80 dB (FIG. 22).

$$\xi r = \delta r / 2\pi fr = 1/\tau r(2\pi fr)$$

The decay related to time constant "τr" is a factor of e, so in dB −20 log(e) or −8.7 dB, the time is 22.5 ms, a damping ratio=0.0135.

As shown in further detail in FIGS. 23-26, for the mode strength, Residue (R) calculation are the mode shapes.

$$R = H(fo)\cdot\sigma \text{ where } s = 1/\tau(\text{decay rate})$$

and general Residue is defining the bone vibration transducer (BVT) mode shape using quadrature picking, $$Rijr = a\cdot\psi ir\cdot\psi jr \text{ where "}a\text{" is any number but "0", so "1" is assigned.}$$

Figure 23:
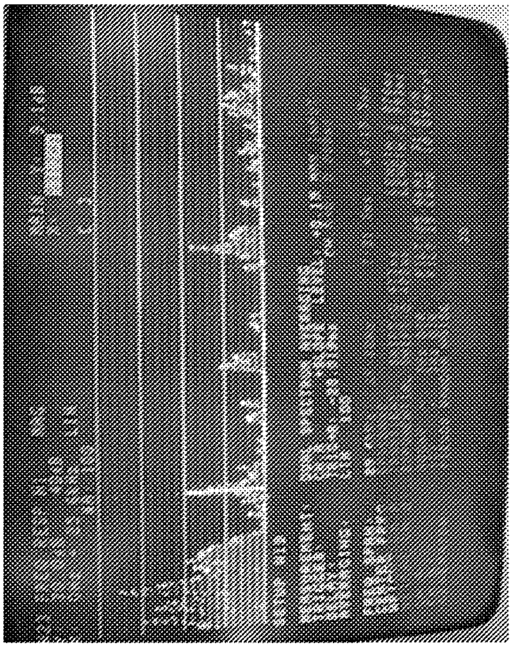
Figure 24:
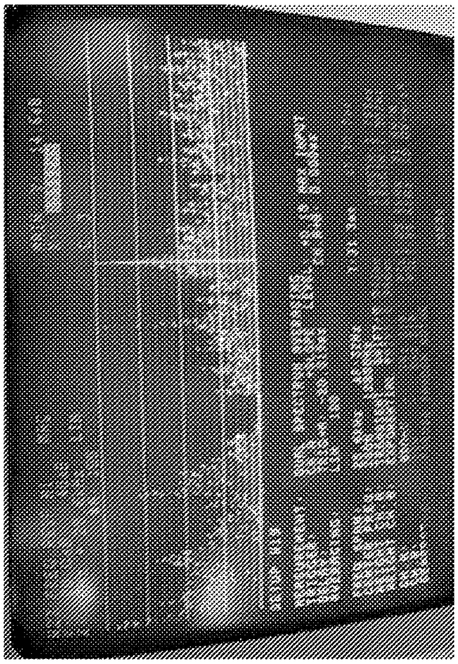
Figure 25:
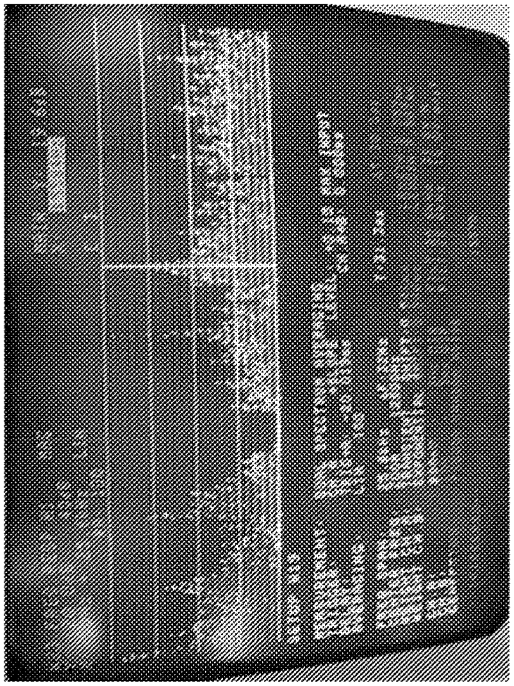
Figure 26:
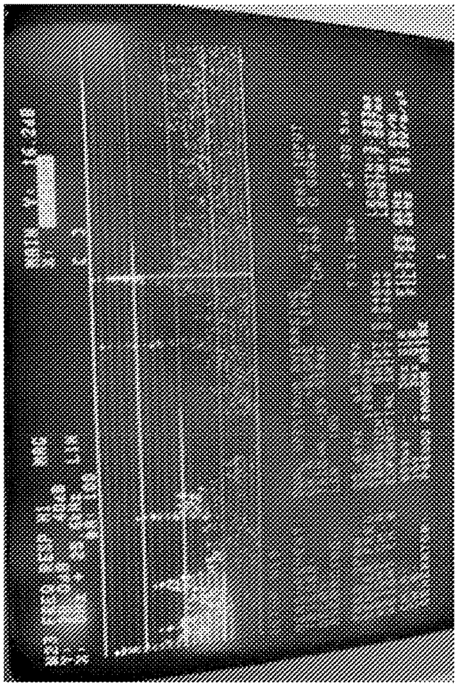

As a system with a single degree of freedom with widely spaced modes, the acceleration or frequency response function is the imaginary part of the resonances or mode shape. Various excitations are performed measuring at the same point and direction and various modes appeared as the imaginary part or magnitude of different frequencies, with modes on 524 Hz, 897 Hz, 1,708 Hz, 5,312 Hz, 15,484 Hz (FIG. 23). The accelerometer resonance did not affect the measurements since its resonance is 55 KHz. The range frequency of interest should be near 16 KHz and 15,484 Hz (see FIG. 24). The measured modal damping at this specific modal frequency is 0.001 or the half power frequency range of 15,584 Hz and 15,616 Hz (see FIGS. 25-26).

1.3 Results

Evident results show that a force within the range of +/−1 pC/N on exciter input of 1 VRMS is the required level for the ideal loud perception of high frequencies. Since this range can be achieved by implementing the pivot method (the bone vibration transducer (BVT)), the pivot implementation is an adequate approach to increase the force by reducing energy consumption. At the same time, reaching high frequency vibrations with an exciter with lower mass components is the efficient approach to achieve lower power consumption.

The modal analysis shows mode results on the VAH 524 Hz, 897 Hz, 1,708 Hz, 5,312 Hz, and 15,484 Hz. The last mode on 15,484 Hz is ideal for the interested 16 KHz magnitude to reproduce. This mode at 15,484 Hz might be caused by the amount of brass on the VAH, which is not presented inside the human head. Brass is used to achieve the mass of the head. Also, the damping ratio is less than 0.0135, which is a good condition.

Experiment 2

Figure 27:
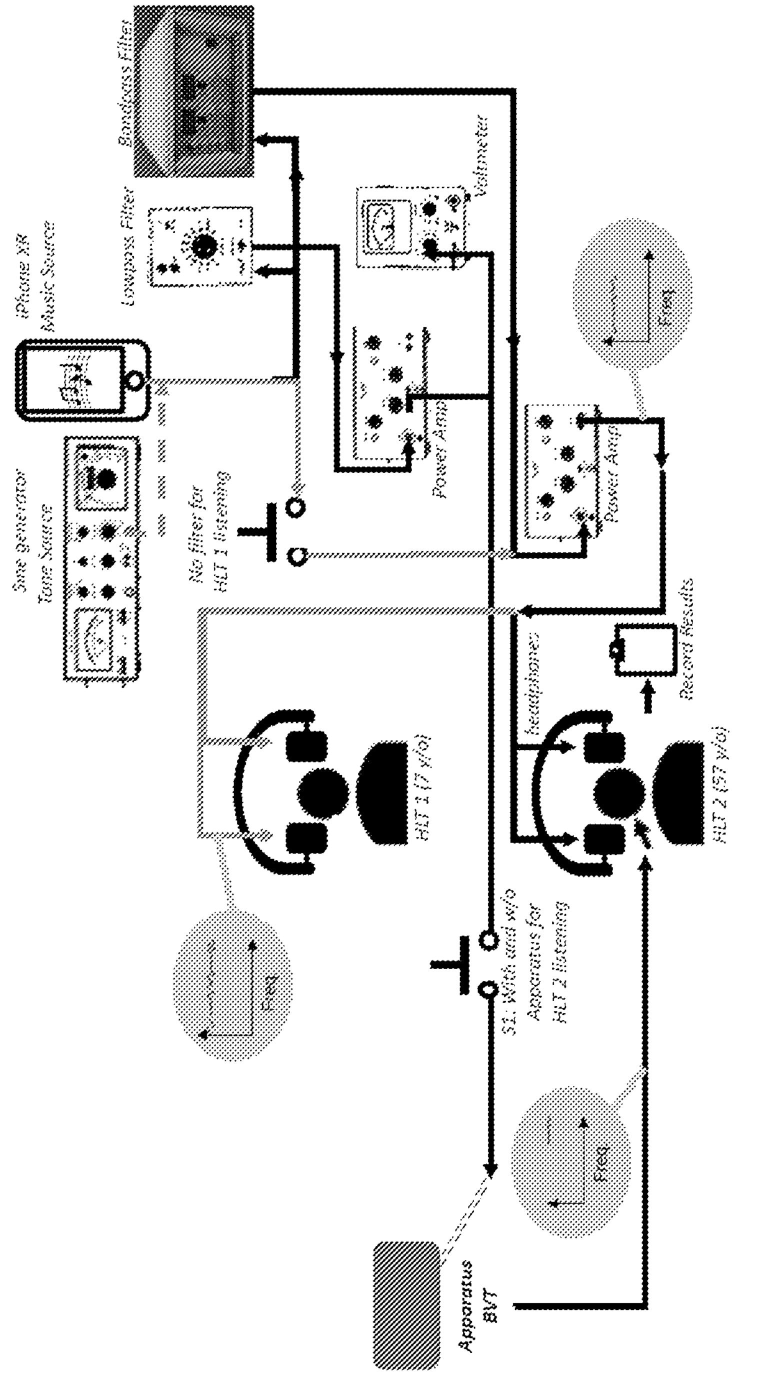
FIG. 27 is a schematic diagram of experiment 2 with the system used by two listeners or HLT.

Referring to FIG. 27, in order to apply the idea to create an efficient bone vibration transducer BVT apparatus that would transfer vibrations from the lower side of the face or vermilion lips to the left and right inner ears, the vibration transfer media are the scull bones through the Temporals and the Occipital bones. The Occipital bone represents the highest thickness and density in the skull, so it will be critical for bone vibration transfer to the hearing system. Other body bones could be exposed to this approach and are part of this invention. Now, it is required to generate a considerable force using the bone vibration transducer BVT apparatus that is relatively small and to be used at the lower side of the face under the mouth consuming a low amount of energy. Because there is no direct exposed access of solid surfaces to the Temporals and the Occipital bones from the outside of the human hearing organs, the challenge is to generate a high amount of vibration signal force that is acceptable to be perceived by young individuals hearing.

The BVT apparatus characteristics are shown below: a. adequate mass, b: low energy consumption, c. acceleration performance (or vector vibration) to be perceived in human hearing organs.

The BVT apparatus characteristics in detail are:

Adequate mass: Using 2 Li-Ion rechargeable batteries (0.6 W/h) have a 20 g mass, the circuit is 15 g, the transport exciters are 5 g, and the enclosure is 10 g. The total mass of the BVT apparatus is 50 g.

Low Energy Consumption: Mounting on the lower side of the user's face and using the labials for holding the portable BVT apparatus is part of the invention. This method may achieve proper weight and energy consumption. The total mass of the BVT apparatus is less than/or equal to 50 g, and the energy consumption of the BVT apparatus is 600 J (Joules) of energy. For example, the adequate Li-Ion rechargeable battery currently available in the market is used in the BVT apparatus (mass of 5 g with 3.7 VDC and 180 mA/h). Ideally, two batteries may release enough energy for the BVT apparatus to satisfy a minimum of 8 hours of use.

Perception of vector vibration or acceleration performance perceived at human hearing organs: In order to achieve the vibration performance for appropriate human hearing organ perception of the original music, two experiment parameters are presented:

The first parameter: Qualitative experimentation comparing perceptions of the BVT apparatus used by two listeners or HLT (Human listener under Test); the first HLT 1 is 7 years/old female with HHO (human hearing organs) frequency perception capabilities in the early stage of life (or close to 20 Hz to 20 KHz bandwidth) and the second HLT 2 is 57 years/old male with limited HHO (human hearing organs) hearing bandwidth.

The second parameter: Quantitative experimentation measuring the BVT apparatus acceleration performance with respect to a common exciter; it is demonstrated that the implementation of CARBON GRAPHITE and the "PIVOT METHOD" could improve the BVT apparatus exciter performance.

Experiment 2.1: Qualitative Performance Between HLT 1 and HLT 2.

Non-numerical experimentation comparing perceptions of the BVT apparatus used by two listeners or HLT, the first HLT 1 is 7 years/old female with HHO frequency perception capabilities in the early stage of life (complete frequency bandwidth of hearing), and the second HLT 2 is 57 years/old male with limited HHO hearing bandwidth. The first and second parameters are performed, wherein the input audio signal may be a music source or sound tones.

2.2 Experiment Procedure.

HLT1 (7 years old) and HLT2 (57 years old) are exposed to 11 different audio tones through a reference headphone set with 80 dB S.P.L. volume levels for 5 seconds for each tone. The experiment is recorded when HLT1 and HLT2 would or wouldn't perceive the tones. Then, HLT2 are exposed to the same tones through a headphone set and wearing the bone vibration transducer (BVT) in which a 16 KHz tone and HLT2 would or wouldn't perceive the recorded tones. Subsequently, the tones are substituted with 3 minutes of music (Title: For the first time in Forever by Kristen Bell & Idina Menzel) for HLT2, who responds to the question if the music improves when S1 is switched (with and without signal on bone vibration transducer (BVT)). Response recorded.

2.3 Findings.

Referring to FIG. 28, after using the apparatus (BVT), the perception of high frequencies (16 KHz) is improved. No perception by HLT1 and HLT2 on 31.5 KHz confirms that the recorded results are trustable. Also, clear music improvement is recorded on HLT2 while using the BVT for reproducing high frequencies. In such a way, the music sound is clearer and more detailed than the results of being without wearing the apparatus (BVT).

2.4 Result.

Using the apparatus idea, HLT2 (57 yrs/old) can perceive high frequencies (16 KHz) and is recorded music improvement described as "Clear music."

According to the embodiments mentioned above, the headphones set used in the experimentation is the Sony MDR-XB950B1. The Sony MDR-XB950B1 is chosen because it has a very good sound performance and is very popular. The human hearing organ (HHO) used as a reference is the human hearing system. The specifications for Sony MDR-XB950B1 are presented as followings. For maximum power applied by the headphone amplifier, since the Sony MDR-XB950B1 is 105 dB/mW on 32 Ohm, the conversion is defined as: dB/V=dB/mW-10*log (Impedance/1000), which is equivalent to 139 dB/mV at 1 KHz. EN 50332-1:2013 recommends audio volumes on the magnitude of 85 dB as an absolute maximum volume, which is equivalent to 316 mVRMS.

Those with ordinary skill in the art may make many alterations and modifications without departing from the spirit and scope of the disclosed embodiments. Therefore, it must be understood that the illustrated embodiments have been set forth only for the purposes of example and that it should not be taken as limiting the embodiments as defined by the following claims. For example, notwithstanding the fact that the elements of a claim are set forth below in a certain combination, it must be expressly understood that the embodiment includes other combinations of fewer, more, or different elements, which are disclosed herein even when not initially claimed in such combinations.

Thus, specific embodiments and applications of the system and method for perceiving high audio frequencies in stereo through human bones have been disclosed. It should be apparent, however, to those skilled in the art that many more modifications besides those already described are possible without departing from the disclosed concepts herein. Therefore, the disclosed embodiments are not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, utilized, or combined with other elements, components, or steps that are not expressly referenced. Insubstantial changes from the claimed subject matter as viewed by a person with ordinary skill in the art, now known or later devised, are expressly contemplated as equivalent within the scope of the claims. Therefore, obvious substitutions now or later known to one with ordinary skill in the art are defined to be within the scope of the defined elements. The claims are thus to be understood to include what is specifically illustrated and described above, what is conceptually equivalent, what can be obviously substituted, and what essentially incorporates the essential idea of the embodiments. In addition, where the specification and claims refer to at least one of something selected from the group consisting of A, B, C . . . and N, the text should be interpreted as requiring at least one element from the group which includes N, not A plus N, or B plus N, etc.

The words used in this specification to describe the various embodiments are to be understood not only in the sense of their commonly defined meanings but to include by special definition in this specification structure, material, or acts beyond the scope of the commonly defined meanings. Thus, if an element can be understood in this specification as including more than one meaning, its use in a claim must be understood as being generic to all possible meanings supported by the specification, and its use in a claim must be understood as being generic to all possible meanings supported by the specification and the word itself.

The definitions of the words or elements of the following claims, therefore, include not only the combination of elements set forth but all equivalent structures, material, or acts for performing substantially the same function in the same way to obtain the same result. Therefore, it is contemplated that an equivalent substitution of two or more elements may be made for any of the elements in the claims below or that a single element may be substituted for two or more elements in a claim. Although elements may be described above as acting in certain combinations and even initially claimed as such, it is to be expressly understood that one or more elements from a claimed combination can, in some cases, be excised from the combination and that the claimed combination may be directed to a subcombination or variation of a subcombination.

What is claimed is:

1. A system for perceiving high audio frequencies in stereo, comprising:

a bone vibration transducer comprising an exciter configured to receive high frequency signal components and to reproduce the high frequency signal components; and the bone vibration transducer further comprising a swingable bar pivotally coupled with the exciter via a pivot holder to perform a swinging movement;

wherein in the swinging movement, the swingable bar is swung to generate vibrations waves corresponding to the reproduced high frequency signal components and to convey the vibration waves to at least one bone of a user, wherein the swingable bar comprises a brass bar and a polymer bar overlappedly arranged on the brass bar.

2. The system of claim 1, wherein the swingable bar is placed adjacent to a mandibular vestibule of the user's mouth.

3. The system of claim 1, wherein the exciter is placed outside the user's mouth.

4. The system of claim 1, wherein the brass bar is sandwiched in between the swingable bar and the polymer bar, wherein the swingable bar is pivotally coupled to the brass bar.

5. The system of claim 1, wherein, in the swinging movement, the swingable bar is vertically moving with respect to the pivot holder.

6. The system of claim 1, further comprising a headphone set placed adjacent to the user's ears and configurated to receive middle-to-low frequency signal components and a second accelerometer placed adjacent to occipital bones of the user to receive the vibration waves and to convey the vibration waves to a second analyzer, wherein the second analyzer is configured to analyze the vibration waves and generate a second high frequency report.

7. The system of claim 1, wherein the at least one bone of the user comprises maxilla and/or mandibular bones and/or temporal bones, and/or occipital bones.

8. The system of claim 1, further comprising a first accelerometer coupled on the swingable bar and configured to measure the vibration waves and to convey the vibration waves to a first analyzer, wherein the first analyzer is configured to analyze the vibration waves and generate a first high frequency report.

9. The system of claim 1, further comprising a high pass filter communicated with a headphone set and a low pass filter communicated with the exciter, wherein the high pass filter is configured to extract high frequency signal components from input audio signals and the low pass filter is configured to extract medium to low frequency signal components from the input audio signals.

10. A method for perceiving high audio frequency in stereo, comprising:

pivotally coupling a swingable bar with an exciter via a pivot holder to form a bone vibration transducer;

receiving, by the exciter, high-frequency signal components and reproducing the high frequency signal components;

generating, by the swingable bar, vibration waves corresponding to the reproduced high frequency signal components in a swinging movement; and conveying, by the swingable bar, the vibration waves to at least one bone of a user, wherein the swingable bar comprises a brass bar and a polymer bar overlappedly arranged on the brass bar.

11. The method of claim 10, further comprising a step of placing the swingable bar adjacent to mandibular vestibule of the user's mouth.

12. The method of claim 10, further comprising a step of positioning the exciter outside the user's mouth.

13. The method of claim 10, wherein the brass bar is sandwiched in between the swingable bar and the polymer bar, and the swingable bar is pivotally coupled to the brass bar.

14. The method of claim 10, the step of generating, by the swingable bar, vibration waves corresponding to the reproduced high frequency signal components in a swinging movement further comprises a step of vertically moving the swingable bar with respect to the pivot holder.

15. The method of claim 10, further comprising steps of:

placing a headphone set adjacent to the user's ears, wherein the headphone set is configurated to receive middle-to-low frequency signal components;

placing a second accelerometer adjacent to occipital bones of the user;

receiving, by the second accelerometer, the vibration waves and conveying the vibration waves to the second analyzer; and analyzing, by the second analyzer, the vibration waves to generate a second high frequency report.

16. The method of claim 10, wherein the at least one bone of the user comprises maxilla and/or mandibular bones and/or temporal bones, and/or occipital bones.

17. The method of claim 10, further comprising steps of:

coupling a first accelerometer on the swingable bar;

measuring, by the first accelerometer, the vibration waves and conveying the vibration waves to a first analyzer; and analyzing, by the first analyzer, the vibration waves to generate a first high frequency report.

18. The method of claim 10, further comprising steps of:

communicating a high pass filter with a headphone set;

extracting, by the high pass filter, high frequency signal components from input audio signals;

communicating a low pass filter with exciter; and extracting, by the low pass filter, medium-to-low frequency signal components from the input audio signals.

* * * * *